July 8, 1969  MASAITI SAKAMOTO  3,453,740
APPARATUS FOR CHECKING THE WHEEL ALIGNMENT OF AN AUTOMOBILE
Filed Aug. 23, 1966

INVENTOR.
Masaiti Sakamoto
BY
Attorney

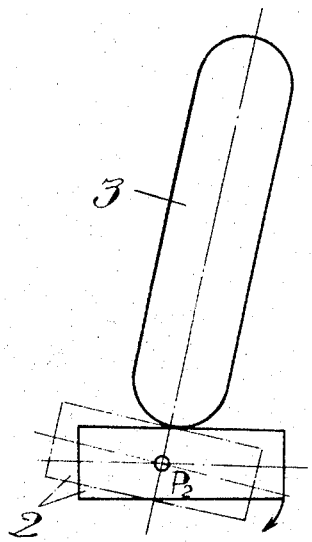
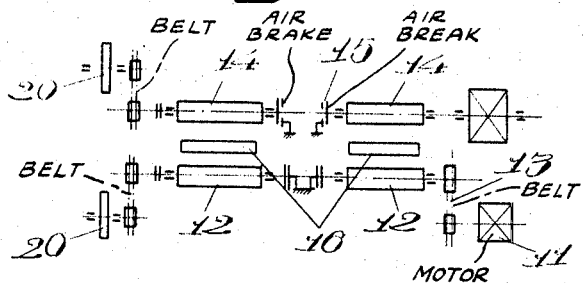
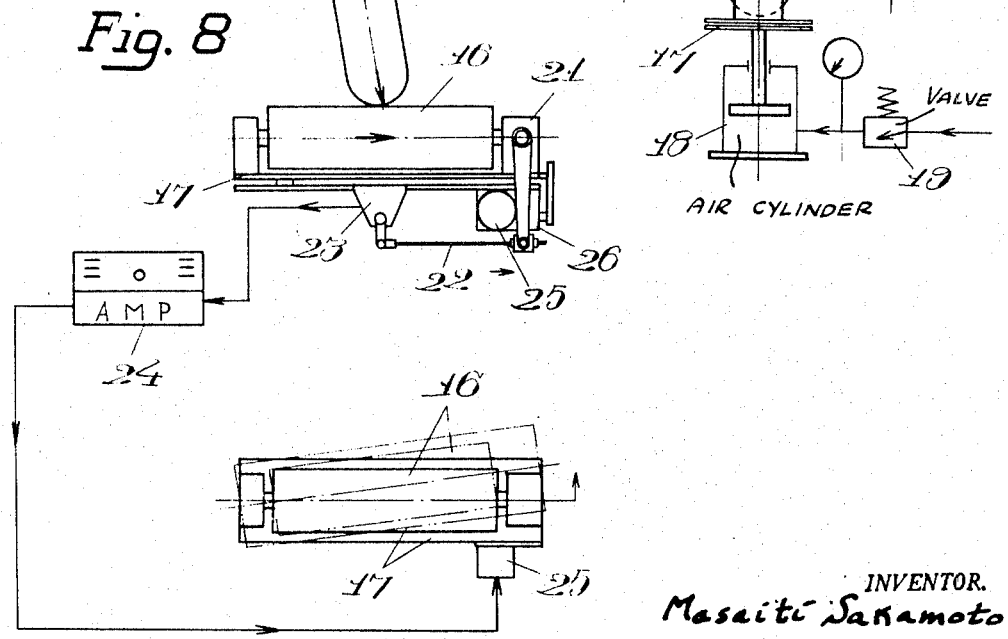

United States Patent Office 3,453,740
Patented July 8, 1969

3,453,740
APPARATUS FOR CHECKING THE WHEEL
ALIGNMENT OF AN AUTOMOBILE
Masaiti Sakamoto, Tokyo, Japan, assignor to Anzen
Jidosha Kabushiki Kaisha, Tokyo, Japan
Filed Aug. 23, 1966, Ser. No. 574,380
Int. Cl. G01b 5/255, 7/315
U.S. Cl. 33—203.13                                   3 Claims

ABSTRACT OF THE DISCLOSURE

For checking automobile wheel alignment, each front wheel of a vehicle is supported on two angularly spaced rollers, one of which is driven to rotate the wheel. A checking roller disposed between the two spaced rollers engages the periphery of the wheel to be driven thereby. Each checking roller is mounted on a frame for rotary and axial movement; and each frame pivots about an axis perpendicular to the axis of its checking roller. An electrically operated indicating mechanism indicates axial movement of the checking rollers. Thus, camber, toe-in or out, etc., of the wheels can be measured.

This invention relates to a method and apparatus for checking or measuring the state of automobile wheel alignment.

An object of the present invention is to provide a method and apparatus for checking automobile wheel alignment whereby alignment figures such as toe-in slip, camber slip, toe-in angle, camber angle, king pin inclination, and toe-out angle as the wheel is steered in the lateral direction, may be calculated from the sideslip angle of the wheel measured precisely near its running condition.

Another object of the present invention is to provide a method and apparatus for checking automobile wheel alignment wherein the wheel to be tested is placed on and rotated by rotation of two parallel support rollers, and an additional checking roller is placed adjacent to the wheel and is checked for its turning angle relative to the wheel, while said checking roller traverses a certain distance corresponding to the covered distance, thereby to eliminate errors in each measurement operation and to attain greater accuracy in measurement.

A further object of the present invention is to provide a method and apparatus for measurement of automobile wheel alignment wherein the sideslip caused to the wheel may be detected precisely based on the thrust force developed on a single checking roller positioned intermediate two support rollers due to the sideslip caused to the running wheel, and its figure may be readily indicated through a computing system.

A further object of the present invention is to provide a method and apparatus for measurement of automobile front wheel alignment wherein the abovementioned figures may be calculated on the production line while the vehicle is resting in a stationary position with its front wheels on two parallel support rollers, and wherein the correction operation may be carried out while the reading of these figures is taken by the operator.

The present invention resides in a method for measurement of automobile wheel alignment characterized by the feature that the alignment figures may be calculated by imparting an axial thrust due to the sideslip of the running wheel to a single checking roller placed intermediate two parallel support rollers, turning said checking roller until said axial thrusts are neutralized, and measuring the angle by which said checking roller has been turned.

The present invention also resides in an apparatus for measurement of automobile wheel alignment characterized by having two parallel disposed support rollers, at least one of which is a driving roller, a single checking roller adapted to turn horizontally under the thrust produced by rotation of the wheel disposed intermediate said support rolers, and a computing system to compute the alignment figures from the turning angle of this checking roller.

The present invention consists furthermore in an apparatus for measurement of automobile wheel alignment characterized by having two support rollers carried by two frames, at least one of said rollers being a driving roller and the said frames carrying support rollers for each of the wheels of the vehicle to be tested, an additional checking roller adapted to turn horizontally under the axial thrust due to rotation of the wheel disposed intermediate said support rollers, means for turning the left-side and right-side frames carrying the respective sets of rollers to the left and right in unison, and a computing system to compute the alignment figures from the turning angles of the checking roller at these points.

Now, the present invention will be described with reference to the accompanying drawings in which certain embodiments of the present invention are illustrated, and in which:

FIG. 5 is an explanatory view showing the equalized state of camber thrusts in the same apparatus;

FIG. 6 is a plan view showing diagrammatically the overall structure of the device according to the present invention;

FIG. 7 is a side elevational view showing each roller in contact with the wheel being tested;

FIG. 8 is an explanatory view showing the structure of the checking roller;

Figure 1:
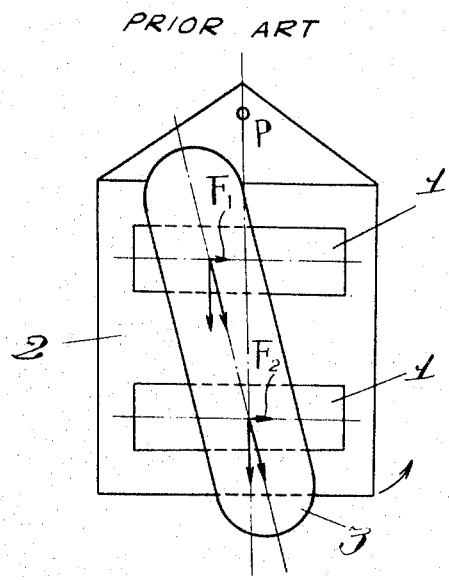
FIG. 1 is a diagrammatic view showing how toe-in thrust is tested in the case of the conventional device.
Figure 2:
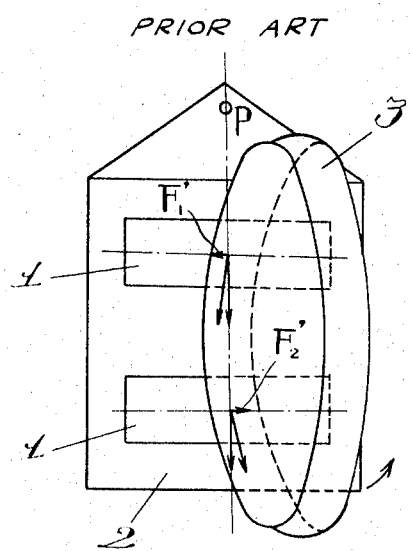
FIG. 2 is an explanatory view showing how camber thrust is tested in the same device.

Referring to FIGS. 1 and 2, numeral 1 indicates two driving support rollers carried in parallel with each other by means of a frame 12.

At least one of said rollers 1 is driven by means of an electric motor or the like, and the wheel 3 being tested is supported by these support rollers 1, 1. Frame 2 may be swiveled about pivot P under the thrust force exerted by the wheel 3 on the rollers 1, 1. Supposing now that the right-hand wheel as shown in FIG. 1 has no camber angle, the thrust forces $F_1$, $F_2$ developed on the rollers in the axial direction thereof due to wheel toe-in will work concurrently to turn the frame 2 in the direction of the arrow with pivot P as its center. The frame 2 will come to a stop at a position in which said axial thrusts $F_1$, $F_2$ are neutralized and rotatory force is reduced to zero. However, since the wheel has camber, the plane of the wheel is not parallel to the central vertical plane, passing through the pivot P, but is inclined thereto at an angle. Hence, the axial thrusts $F_1'$, $F_2'$ are still working on the rollers in the axial direction, as shown in FIG. 2, and the frame 2 is turned additionally in the direction of the arrow with pivot P as its center. It will be apparent from the foregoing that neither wheel toe-in, camber nor sideslip may be calculated in accordance with this known device.

Figure 3:
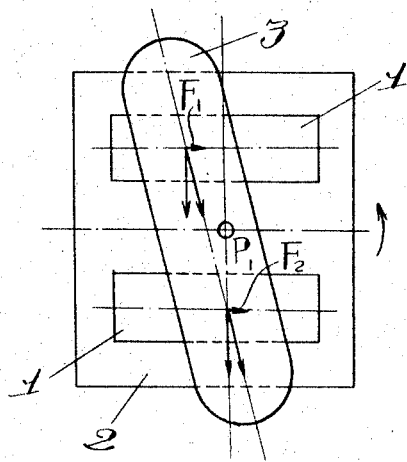
FIG. 3 is an explanatory view showing how toe-in thrust is tested in case of the known apparatus which is an improvement on the conventional device.
Figure 4:
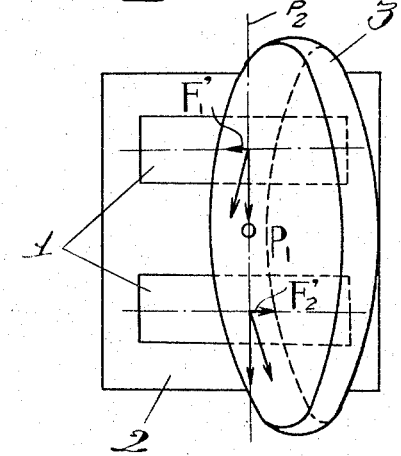
FIG. 4 is an explanatory view showing how camber thrust is tested in the same apparatus.
Figure 9:
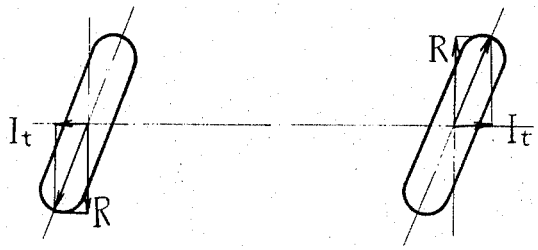
FIG. 9 is an explanatory view showing, by contrast, toe-in thrust on the left-hand wheel rotated in the advancing direction, and toe-in thrust on the same wheel rotated in the receding direction.
Figure 10:
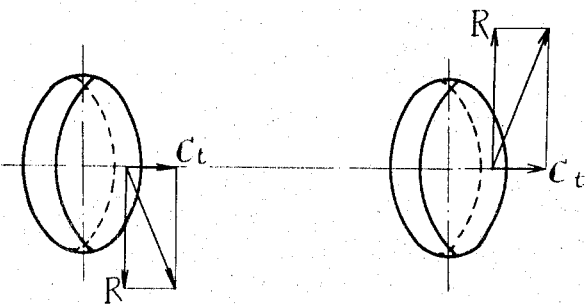
FIG. 10 is an explanatory view showing, by contrast, camber thrust on the left-hand wheel rotated in the advancing direction, and camber thrust on the same wheel rotated in the receding direction.
Figure 11:
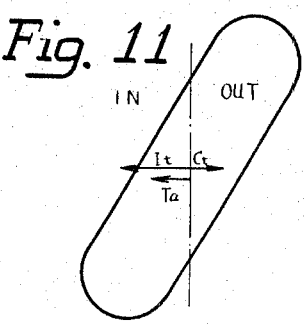
FIG. 11 is an explanatory view showing toe-in thrust and camber thrust working together on the left-hand wheel rotated in the advancing direction.
Figure 12:
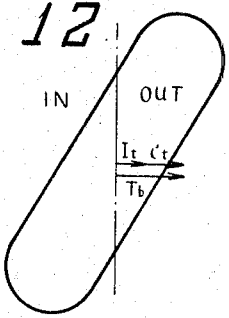
FIG. 12 is an explanatory view showing toe-in and camber thrusts working together on the left-hand wheel rotated in the receding direction.

FIGS. 3 to 5 illustrate testing apparatus which is an improvement on the abovementioned device. In accordance with this apparatus, an additional pivot $P_2$ is provided, and the frame 2 provided with two support rollers 1, 1 is adapted to be tilted or swiveled about this pivot $P_2$ to correct camber angle difference in the same way as the same frame is turned about pivot $P_1$ in the abovementioned device. In the case of the apparatus just described, wheel toe-in and camber may be calculated by turning the frame 2 about pivots $P_1$ and $P_2$ to neutralize the axial thrusts developed on the rollers due to wheel toe-in and camber, and measuring the turning angle of the frame 2. However, in view of the complex mechanism in which the left-hand and right-hand wheels are carried by means of two distinct pivots, and in view of the fact that the state of carrying of the wheels by the pivots must be varied, it may not be very convenient to put this apparatus into practical use.

Referring to FIGS. 6 to 8 by way of illustration of an embodiment of the present invention, numeral 11 indicates an electric motor which can be rotated in either direction and numeral 12 indicates a driving support roller operative to transmit rotation of the motor 11 which has been slowed down via reduction gears to a required speed to the wheel 3 via belt 13, on which the wheel is supported, thereby to rotate the wheel. Numeral 14 indicates driven support roller having the same configuration as driving roller 12 and disposed in parallel with the driving roller 12 to have its axis of rotation aligned with that of the driving roller 12. Two pairs of driving and driven support rollers 12, 14 are provided to support the left-hand and right-hand wheels separately.

In testing, the wheels of the vehicle riding on these rollers 12, 14 are supported thereby and thus brought to a stop. Driving support rollers 12 are rotated by running the motor 11 and the wheel of the vehicle is rotated thereby near its running condition. Numeral 15 indicates an air brake which comes into operation every time the wheels to be tested are disposed on the support rollers 12, 14 and withdrawn after testing. Checking roller 16 is provided intermediate support rollers 12, 14 and the roller 16 moving upwardly by means of an air cylinder 17 working on the support 18 thereof just touches the wheel 3 to be tested. When the wheel 3 is rotated, the checking roller 16 is also rotated, and subjected to an axial thrust produced due to the sideslip of the wheel. Air cylinder 18 comes into operation only in the event that checking is to be performed; and the adjustment of pressure inside air cylinder 18 may be made freely by means of pressure adjustment valve 19. Once such adjustment has been made, the pressure inside the air cylinder may be maintained at all times at a constant value. Numeral 20 indicates a flywheel.

In spite of small contact pressure with which checking roller 16 bears against the wheel, a tiny amount of axial thrust will result in a sensible axial displacement of the checking roller 16 due to the high-speed rotation of the roller 16. This axial displacement is transmitted to a thrust sensor unit 21 such as a knife edge. The motion of the unit 21 is amplified by a lever rod 22, and a thrust transducer is thereby actuated to convert said motion into a weak electric potential. By means of transistor amplifier 24, the electric potential is amplified to provide large amount of electric power to rotate servo motor 25. Rotation of servo motor 25 is slowed down by reduction gear 26 having a high reduction ratio, and the support 17 of checking roller 16 is swiveled with a retarded motion by such slowed down rotation, causing the checking roller 16 to turn by a certain angular measure.

The checking roller 16 turned at such an angle compensates for toe-in and camber thrusts working thereon and the axial thrust will no longer operate on the checking roller 16. Consequently, servo motor 25 ceases its rotation, and the turning of the checking roller 16 also comes to a halt.

The turning angle of checking roller 16 in the equalized state of axial thrusts gives the sideslip angle of the wheel produced on account of wheel toe-in and camber.

Now, the theoretical explanation of how the checking of sideslip, toe-in slip, camber slip, toe-in and camber angles is performed will be given with reference to FIGS. 9 to 12. As noted in the foregoing, thrust force due to camber is working apparently at all times on the running wheel, just as toe-in thrust due to wheel toe-in is working on the running wheel thus causing the sideslip of the wheel. Experimentally, the amount of toe-in thrust and that of camber thrust are increased or decreased in direct proportion to the toe-in angle and camber angle respectively and toe-in and camber thrusts are neutralized in the event that toe-in and camber angles are reduced to zero. It follows from this that wheel toe-in and camber are identical in their properties, and computation of their values may be conducted on the same basis.

Referring to the figures, in which the left-hand wheel is illustrated in both the advancing and receding directions, R indicates rolling resistance of the wheel, $I_t$ indicates toe-in thrust, $C_t$ indicates camber thrust, $T_a$ indicates the sum of toe-in and camber thrusts as the wheel is rotated in the advancing direction, and $T_b$ indicates the sum of toe-in and camber thrusts as the wheel is rotated in the receding direction. Supposing now that the wheel has a camber which causes the thrust to work towards the inside of the wheel, camber thrust will operate to decrease toe-in thrust while the wheel is rotated in the advancing direction, and to increase toe-in thrust while the wheel is rotated in the receding direction. Consequently, wheel toe-in will be decreased apparently while the wheel is rotated in the advancing direction and, increased while the wheel is rotated in the opposite direction. In like manner, sideslip will be decreased apparently while the wheel is rotated in the advancing direction, and increased while the wheel is rotated in the opposite direction. If the thrust working towards the outside of the wheel is indicated with a plus (+) sign, and the thrust working towards the inside of the wheel is indicated with a minus (−) sign, $T_a$ and $T_b$ are given by $$T_a = I_t - C_t$$
$$T_b = -(I_t + C_t)$$

From these formulas, $I_t$ and $C_t$ are given by $$I_t = \frac{T_a - T_b}{2}$$

$$C_t = \frac{T_a + T_b}{2}$$

In compliance with the above theoretical consideration, toe-in slip and camber slip may be given in a most simple manner. By substituting for the thrusts in the above formulas the amounts of slip caused to the wheel, the amounts of toe-in slip and camber slip are given by the following formulas:

Toe-in slip = ½ × (sideslip caused to the wheel rotated in the advancing direction — sideslip caused to the wheel rotated in the receding direction)

Camber slip = −½ × (sideslip caused to the wheel rotated in the advancing direction−sideslip caused to the wheel rotated in the receding direction)

In the measurement operation in accordance with the present apparatus, driving support rollers 12 are rotated in the advancing direction, and the amount of sideslip caused to the wheel is checked by the medium of the checking roller 16. Subsequently, the driving support rollers 12 are rotated in the receding direction, and the amount of sideslip caused to the wheel rotated in the receding direction is checked in the like manner. The amounts of toe-in slip and camber slip are obtained by performing the operation based on these numerical values. These amounts may readily be obtained by means of an indicating system and read out on the indicator separately.

Obviously, the toe-in and camber angles may be obtained in the like manner by the formulas Toe-in angle = ½ × (angle of sideslip caused to the wheel rotated in the advancing direction−angle of sideslip caused to the wheel rotated in the receding direction.

Camber angle = −½ × (angle of sideslip caused to the wheel rotated in the advancing direction+angle of sideslip caused to the wheel rotated in the receding direction)

Figure 13:
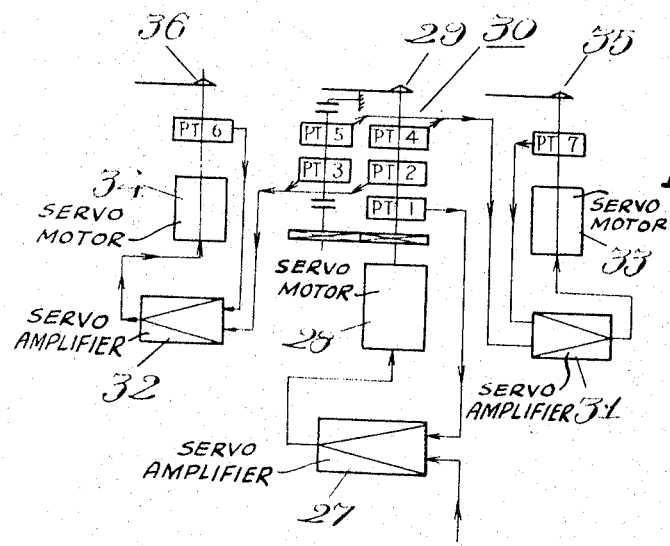
FIG. 13 is a view showing an embodiment of a computing system.

An indicating system is illustrated, by way of an example in FIG. 13. In this system, the turning angle of the checking roller 16 is transduced into an electrical potential by means of a thrust transducer 23 (FIG. 8). The electric potential thus produced is amplified by means of a servo-amplifier 27, the output side of which is connected to a servo motor 28; and the latter is thus set into motion. The amount of side slip caused to the wheel rotated in the advancing direction is indicated on a servo indicator 29 for sideslip indication. This indication is memorized mechanically as the checking roller 16 is reversed and is contrasted with the amount of sideslip of the receding wheel which is to be checked subsequently in like manner. Then, an operation is performed by computation, memory and transmitting system 30 including a synchro-transmitter, a digital transducer, an addition and substraction system, a multiplication and division system, a function oscillator system, a limit switch and so forth. The output signals are amplified respectively by servo amplifier 31, 32, and the servo motors 33, 34 are set in motion. The results are indicated on the servo indicator 35 for toe-in slip indication and on the servo indicator 36 for camber slip indication respectively.

Figure 14:
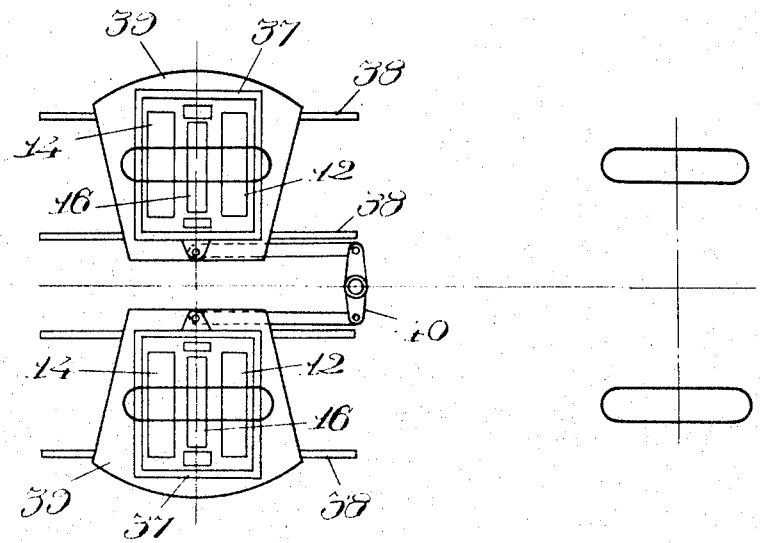
FIG. 14 is a plan view showing another embodiment of the present invention, in which measurement of sideslip, toe-in and camber is being taken.
Figure 15:
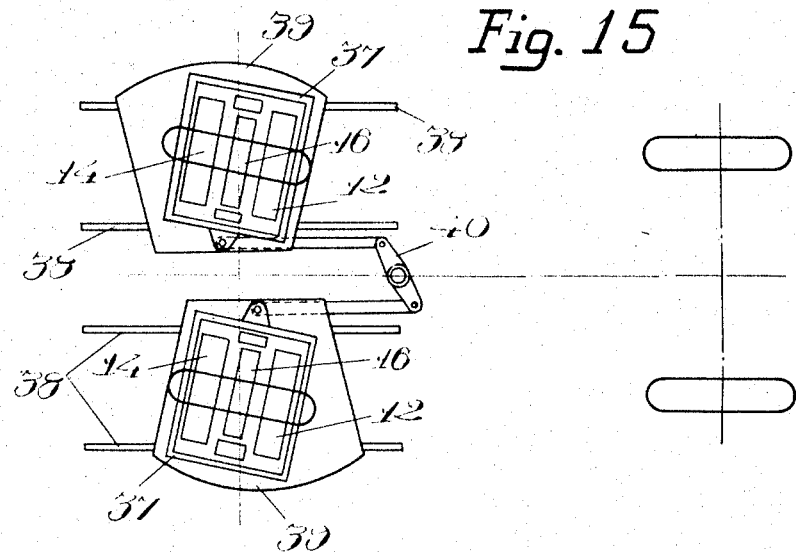
FIG. 15 is a plan view of the same embodiment in which measurement of castor angle, king pin inclination and toe-out angle as the wheel is steered is being taken.

FIGS. 14 and 15 illustrate a further embodiment of the invention wherein the preceding embodiment has been improved so that castor angle, king pin inclination and toe-out as the wheel is steered may also be calculated. In this embodiment, both the left-hand and right-hand devices as mentioned in the preceding embodiment are supported by separately provided frames 37, 37. These frames 37, 37 are carried on the truck frames 39, 39 moving along their respective rails 38, 38, and are linked together by the link device 40 so as to be turned to the left and right in unison. In the present embodiment, the frames 37, 37 are adapted to turn 12° to the left and right, respectively.

Numerals 12 and 14 in the figures indicate support rollers and 16 indicates checking rollers as in the preceding embodiment.

Provided that the support rollers 12, 14 are fixedly mounted with the axes of rotation thereof at right angles with the center line of the vehicle, as illustrated in FIG. 14, measurement of sideslip, toe-in and camber may be performed in the same way as mentioned previously.

In measuring castor angle, the left-hand and right-hand frames 37, 37 are turned in unison 12° to the right, and are fixed there. Then, the driving support rollers 12, 12 are rotated in the advancing direction, and the sideslip caused to the wheel rotated in the advancing direction is checked at this point.

Next, the sideslip caused to the wheel rotated in the receding direction is checked by reversing the driving rollers 12, 12. Then, the toe-in and camber as the support rollers are turned to the right are computed by means of the computing system. The camber measured at this point is held on the memory system. Next, the left-hand and right-hand frames 37, 37 are turned 12° to the left or in the reverse direction, and are fixed there. At this point, the camber angle as the support rollers are turned to the left is checked in the like manner.

In this way, the camber angles with the support rollers 12, 14 turned 12° to the right and left are checked and entered in the computing system enclosed inside the indicator for computation of the castor angle and indication of the same on the indicator.

The basic formula for performing such computation is the same as the principle employed in the conventional wheel alignment tester, and the castor angle of the right-hand wheel is $$C_s = \frac{1}{2 \sin \theta}(C_{b_1} - C_{b_2})$$

while the castor angle of the left-hand wheel is $$C_s = \frac{1}{2 \sin \theta}(-C_{b_1} + C_{b_2})$$

wherein $C_s$, $C_{b_1}$, $C_{b_2}$ and $\theta$ indicate respectively castor angle, camber angle as the support rollers are turned to the right, camber angle as the support rollers are turned to the left, and turning angle 12°.

Since $\theta$ equals to 12°, $$\frac{1}{2 \sin \theta} \doteq 2.4$$

the castor angle of the right-hand wheel then is $$C_s = 2.4(C_{b_1} - C_{b_2})$$

and the castor angle of the left-hand wheel is $$C_s = 2.4(-C_{b_1} + C_{b_2})$$

In measuring king pin inclination, support rollers are turned to the left and right as in the case of measurement of castor angle, and the camber angles are measured at these points. The camber angles thus obtained are held severally in the memory system. In like manner, the camber angle when the rollers are in the straight-ahead position is measured and entered in the memory system. Then, the operation is performed on the basis of these values and the result is indicated on the indicator.

The basic formula used in this computation is $$K = \frac{1}{2 \sin \theta}(C_{b_1} + C_{b_2}) - C_b$$

Substituting $$\frac{1}{2 \sin \theta} \doteq 2.4$$

$$K = 2.4(C_{b_1} + C_{b_2} - C_b)$$

wherein $C_b$ and $K$ indicate respectively camber angle as the support rollers are in the straight-ahead position, and kingpin inclination.

As is apparent from the foregoing, toe-out may be indicated at the same time as camber angles with the support rollers turned 12° to the right and to the left respectively.

As described in the foregoing, with the present invention accurate measurement of sideslip of the wheel may be performed near its running condition on the basis of the thrust force developed on a single checking roller; and alignment figures, such as toe-in slip, camber slip, toe-in angle, camber angle, castor angle, king pin inclination and toe-out, as the wheel is steered, may be obtained at the same time.

What is claimed is:
1. Apparatus for measuring wheel alignment of the front wheels of an automotive vehicle comprising
   two sets of support rollers, each set of support rollers comprising two angularly spaced rollers mounted to rotate on parallel axes and serving to support one of the front wheels of the vehicle at two angularly spaced points around the wheel,
   means for driving at least one support roller of each set thereby to rotate the wheel,
   a checking roller disposed between the two rollers of each set of support rollers to engage the periphery of the wheel to be driven by the wheel as it rotates,
   a support for said checking roller mounting said checking roller for rotary and axial movement,
   said support being pivotal about an axis perpendicular to the axis of said checking roller,
   means for converting axial motion of said checking roller into an electric potential, and
   an electrically operated motor connected to said support to pivot said support about its pivotal axis in response to said potential.
2. Apparatus for measuring wheel alignment as claimed in claim 1, having a servo motor also connected to said support to be operated on pivotal movement of said support, means connected to and driven by said motor for indicating sideslip of a wheel when the wheel is rotating in a forward direction and comparing said sideslip with that occurring when the wheel is driven in the reverse direction, and separate servo motors connected to the first-named servo for driving indivators which indicate toe-in slip and camber slip of the wheel.

3. Apparatus for measuring wheel alignment of the front wheels of an automotive vehicle comprising
   two frames mounted for pivotal movement about parallel axes,
   a set of support rollers journaled on each frame for rotation on parallel axes extending at right angles to the pivotal axis of the frame,
   each set of support rollers serving to support one of the front wheels of the vehicle at two angularly spaced points around the wheel,
   means for driving at least one of the support rollers of each set thereby to rotate the wheel,
   a checking roller mounted on each frame between the two support rollers of that frame to engage the periphery of a wheel to be driven, upon rotation of the wheel, about an axis parallel to the axes of the support rollers and to be movable along its axis, means for indicating axial movement of a checking roller, and a linkage connecting said frames to turn about their pivotal axes in unison.

References Cited

UNITED STATES PATENTS

| 3,187,440 | 6/1965 | Merril et al. | 33—203.13 |
| 3,208,154 | 9/1965 | Pancoast | 33—203.13 |

FOREIGN PATENTS

| 1,235,123 | 5/1960 | France. |

WILLIAM D. MARTIN, JR., *Primary Examiner.*

U.S Cl. X.R.

33—203